United States Patent [19]

Nicholson

[11] Patent Number: 4,908,955
[45] Date of Patent: Mar. 20, 1990

[54] DIRECT READING GAUGE FOR THE MEASUREMENT OF FASTENERS AND FITTINGS

[76] Inventor: Michael Nicholson, 7411 Rogers Ave., Upper Darby, Pa. 19082

[21] Appl. No.: 395,987

[22] Filed: Aug. 21, 1989

[51] Int. Cl.$^4$ .............................................. G01B 3/24
[52] U.S. Cl. ...................................... 33/808; 33/807; 33/558.01
[58] Field of Search ..................... 33/807, 808, 558.01, 33/558.4

[56] References Cited

U.S. PATENT DOCUMENTS

| | | | |
|---|---|---|---|
| 1,264,571 | 4/1918 | Steinhilper | 33/807 |
| 1,303,747 | 5/1919 | Walton | 33/808 |
| 1,631,896 | 6/1927 | St. John et al. | 33/807 |
| 1,998,352 | 4/1935 | Bachmann | 33/149 |
| 2,926,425 | 3/1960 | Fixen | 33/143 |
| 4,635,370 | 1/1987 | Beaver | 33/149 |

FOREIGN PATENT DOCUMENTS 172743 10/1916 Canada ............................. 33/558.01

*Primary Examiner*—William A. Cuchlinski, Jr.
*Assistant Examiner*—William C. Dowling
*Attorney, Agent, or Firm*—Francis A. Varallo

[57] ABSTRACT

A tool adapted to be manipulated single-handed for providing a direct reading of the size of small objects, particularly nuts and bolt heads. The tool includes a pair of tongs which are activated by a thumb slide. The latter is disposed in a slot formed in a planar surface of the tool. Scales, such as SAE and metric, are placed on opposite sides of the slot in operative side-by-side relation. The thumb slide includes a pair of index projections on opposite sides thereof which overlie the scales. Movement of the thumb slide to the point of contact of the extremities of the tongs with the object to be measured, provides a direct reading of the size of the object via the projections and scale markings. The tool includes a lubrication chamber and applicator for use in lubricating couplings and fasteners.

19 Claims, 1 Drawing Sheet

DIRECT READING GAUGE FOR THE
MEASUREMENT OF FASTENERS AND FITTINGS

BACKGROUND OF THE INVENTION

The complexity of present day machinery for a wide variety of applications has necessitated the use of a diversity of fastener and fitting sizes, for example, nuts and bolt heads of different sizes dictated by the mechanical design. Additionally, with the increasing use of metric size fasteners, some machines use both SAE and metric type fasteners, while others are limited to one of the fastener types. It is difficult to visually ascertain the size and the type of the fastener.

In the initial fabrication of such machines, and more particularly in the subsequent servicing thereof, as in the automotive field, the selection of sockets or wrenches of different sizes to accommodate the nuts and bolts becomes a time consuming, inefficient operation. Further, the fasteners are sometimes situated in areas having limited access.

What is desired is a tool which may be easily manipulated by one hand, leaving the other hand free to grasp the proper wrench or socket, and which tool, when applied to the nut or bolt, will give an accurate direct numerical reading of the SAE or metric size of the fastener. The gauge of the present invention provides such a tool.

SUMMARY OF THE INVENTION

In accordance with the present invention there is provided a hand-held tool capable of being used in areas of limited space and which provides a measurement of the size of small objects, such as fittings and fasteners.

The tool of the present invention is comprised of a body member which houses a pair of opposed feeler tongs arranged in a caliper-like configuration. One extremity of the tool is formed with a semicircular opening for receiving the fastener to be measured. When disposed in a rest condition, the tongs are open and their respective tips are retracted within the body member. The body member further serves to protect the tongs from damage when the tool is carried by an operator or stored in a tool box. The tongs, which are spring-stabilized, are activated for measurement purposes by a thumb slide protruding from a planar surface of the tool, and capable of movement within a longitudinal slot formed in the surface. As the thumb slide is moved in a direction toward the semicircular opening in the tool body, internal structural members of the slide contact the tongs and cause the latter to move toward each other. This action permits the tips of the tongs to extend within the opening of the body member and to contact the respective flat surfaces of the fastener being measured. The planar surface of the body member in proximity to the thumb slide includes scales, such as SAE and metric size markings, in side-by-side relationship. The thumb slide further includes projections or pointers disposed relative to the scales, such that a direct measurement reading is provided when the tips of the tongs are in contact with the fastener.

A number of features and advantages are inherent in the structure of the gauging tool of the present invention:

The tool is easy to operate using only one hand, thereby precluding a situation wherein each measurement requires both hands and the tool must be set down in order that a wrench or socket may be picked up to complete the operation.

Another feature of the tool is its size and shape which permits it to be inserted one-handed into an area of limited space and visibility to measure a nut or bolt head. It is not necessary that the operator read the measurement while the tool is so engaged and in fact such visual inspection may not be possible. The tool may be withdrawn after the measurement and the reading made at the convenience of the operator.

Still another feature of the present tool involves the placement of the SAE and metric scales in side-by-side relationship, permitting an easy determination of the measurement without having for example, to turn the tool over, as would be the case if the scales where situated on opposite faces of the tool.

A still further feature of the present tool is the provision on the extremity of the tool body opposite to that having the semicircular opening, of a lubricant chamber and applicator which permits the operator to lubricate the threads of the fasteners and fittings in an efficient manner.

Other features and advantages of the present invention will become apparent in the detailed description thereof which follows.

DETAILED DESCRIPTION OF THE PREFERRED EMBODIMENT

Figure 1:
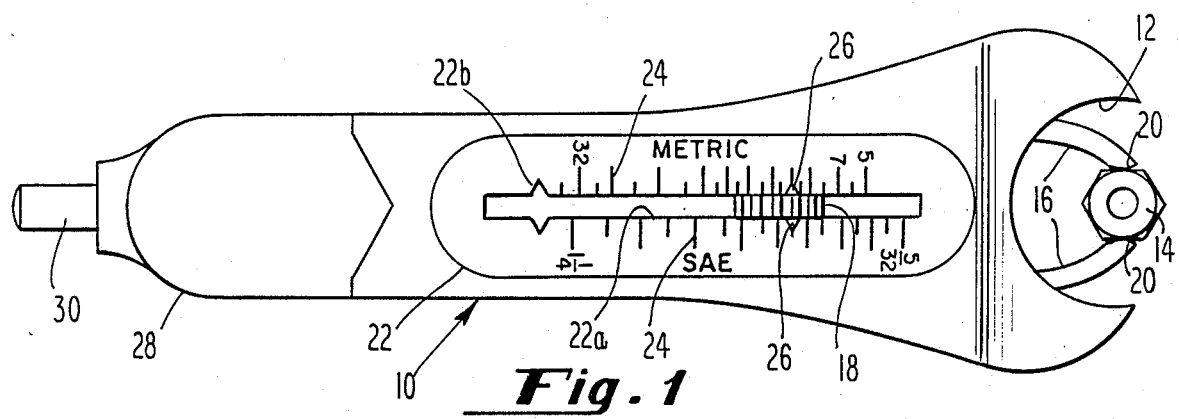
FIG. 1 is a plan view of the tool of the present invention shown with the tongs in a closed position to effect a measurement.

As seen in FIG. 1, the tool of the present invention is comprised of a body member 10 having a semicircular opening 12 at one extremity thereof. The opening 12 accommodates an object, in this case a nut 14, whose size is to be determined. A pair of tongs 16 disposed within the body member 10 i activated by the movement of thumb slide 18 toward the opening, as will be described in detail hereinafter. The tongs 16 extend into the opening 12, permitting the curved tips 20 to contact opposite flat surfaces of the nut 14. The planar face of the body member includes an insert 22 having a longitudinal slot 22a bearing SAE and metric scales 24 in side-by-side relationship. The insert 22 may b of transparent material and the scale markings 24 placed on its underside, where they will be protected from abrasion. At the point where longitudinal movement of the thumb slide 18 is halted by contact of the tips 20 of tongs 16 with the nut 14, the projections or pointers 26 on the thumb slide 18 which overlie the scales 24 provide a direct reading of the size of the nut. The opposite extremity of body member 10 includes a lubrication chamber 28 and an applicator 30 which are best seen in FIGS. 2 and 3.

Figure 2:
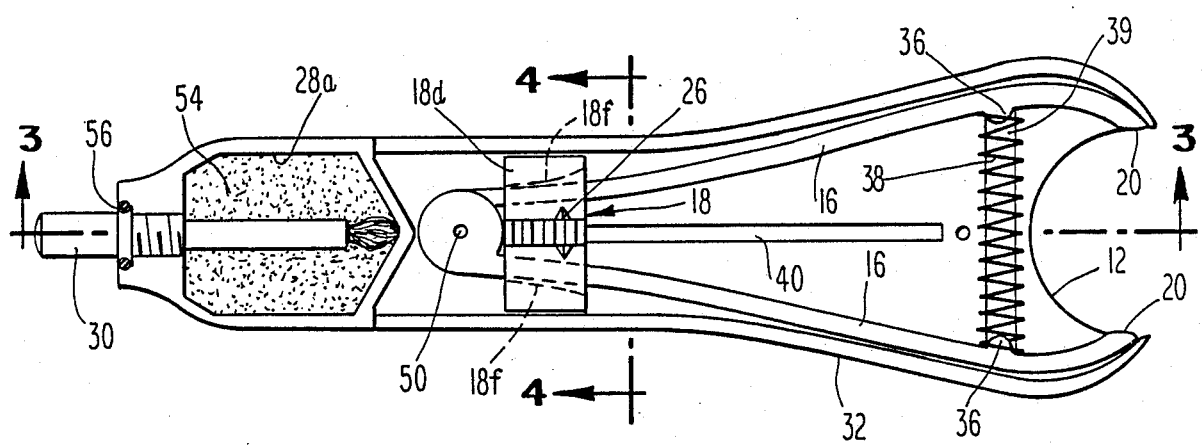
FIG. 2 is a plan view of the base of the tool of FIG. 1, the top cover having been removed and the tongs being in an open or rest position.
Figure 3:
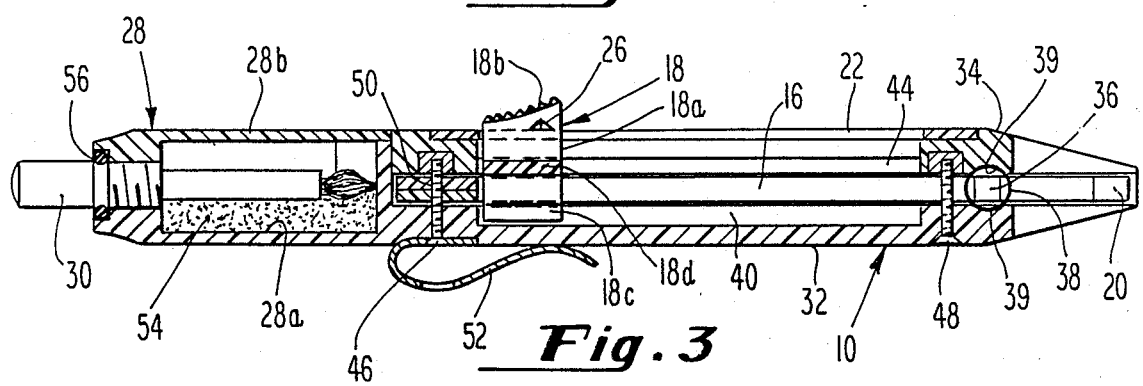
FIG. 3 is a section view of the tool taken along the lines 3'3 of FIG. 2, and having the top cover assembled to the base.

With reference to FIG. 3, the body member 10 is comprised of a base 32 and a top cover 34. Both the base and top cover are tapered at their forward extremity in proximity to opening 12. FIG. 2 illustrates the internal organization of the tool with relation to the base 32, the cover 3 having been removed. The tongs 16 are shown in a rest, that is, non measurement position, and the tips 20 are retracted from the opening 12. The tongs include hubs 36 for retaining a tensioning spring 38. Arcuate grooves 39 formed in the base and top cover accommodate spring 38. The purpose of the spring is to provide stability for the tongs such that they remain in a set position as determined by the thumb slide 18.

Figure 4:
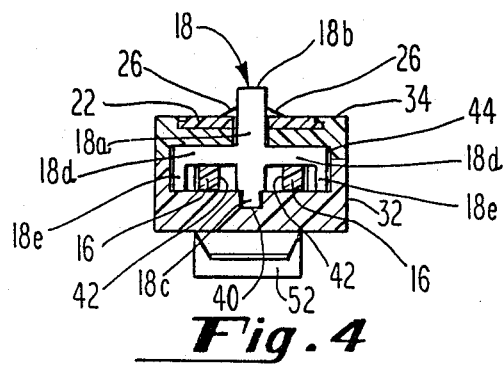
FIG. 4 is a section view of the tool taken long the lines 4—4 of FIG. 2, with the top cover assembled to the base and illustrating particularly the construction of the thumb slide.

As best seen in the section view of FIG. 4, the thumb slide 18 is comprised of a central partition 18a having at one extremity thereof the ridged arcuate thumb portion 18b which protrudes above the insert 22 in the body member 10, and a narrowed rectangular tab 18c which is slidably disposed in groove 40, as best seen in FIG. 2. Approximately midway between the ridged thumb portion 18a and the tab 18c is a section 18d oriented transverse to the central partition and having legs 18e at its extremities parallel to the partition and resting upon the inner surface of base 32. This arrangement provides a pair of substantially rectangular apertures 42 which accommodate the 5 tongs 16. The inner surfaces 18f of the legs 18e which contact the outer surfaces of the tongs 16 are arcuately shaped to conform to the latter surfaces as best seen in FIG. 2. As the thumb slide 18 is moved toward the opening 12 in the body member 10, the tongs 16 tend to close, permitting the tips 20 to extend into the opening. Section 18d is slidable disposed in a broad, shallow groove 44 in the cover 34 as best seen in FIG. 3.

With continued reference to FIG. 3, the tool is assembled by placing the tongs 16 in the base 32, positioning the thumb slide 18 over the tongs with its tab 18c resting in groove 40, placing the cover 34 over the base 32 and simultaneously passing the ridged portion 18b of the thumb slide 18 through the slot 22a in the scale insert 22 (the triangular openings 22b in the slot 22 permitting the passage therethrough of the pointers 26 of the thumb slide). The base and cover are then joined together by screws 46 and 48 which enter the outer surface of the base region and engage threaded inserts in the cover. Screw 46 secures the pivot point for the tongs by way of aperture 50 and also fastens a spring clip 52 to the outer surface of the base. The use of screws to join the base and top cover permit the easy separation of the latter pieces for routine maintenance such as the removal of foreign matter which might have entered the body member.

With continued reference to FIGS. 2 and 3, the extremity of the body member 10 opposite to that having semicircular opening 12, includes a lubrication chamber 28 formed by a cavity 28a in the base and a lubricant cover 28b. The cavity is partially filled with a lubricant such as graphite 54. The base and lubricant cover are threaded to accept an applicator or brush 30 having matching threads. An O-ring 56 fitted on the brush itself prevents spillage of the lubricant when the brush is screwed into the body member. The brush is preferable of the soft-hair bristle type so that the graphite may be applied to the threads of fasteners or the like in a dusting operation. For convenience, the threaded portion of the brush is of the quick-screw thread variety such that the O-ring 56 is seated in less than one turn.

The tool of the present invention finds particular application in the determination of the size of nuts and bolt heads, and the tool as described and illustrated herein, is suited for this application. Changes and modification of the tool may be required for other applications. All such changes and modifications as are within the skill of the mechanical designer, and which do not depart from the true scope and spirit of the invention, are intended to be covered by the claims which follow.

What is claimed is:

1. A gauging tool for providing a direct measurement of the size of an object comprising:
    a body member,
    a pair of tongs disposed within said body member said tongs having tips at their extremities for contacting said object,
    said body member having a substantially planar surface, a longitudinal slot formed in said surface, at least one scale disposed on said planar surface in proximity to said slot,
    thumb slide means operatively disposed in said slot and having an index means, said thumb slide means engaging said tongs, the movement of said thumb slide means along said slot causing said tips of said tongs to contact said object, the subject of said index means relative to said scale providing a direct reading of the size of said object,
    a spring, and means for interposing said spring between said tongs to stabilize the movement of said tongs in accordance with the position of said thumb slide means.

2. A tool as defined in claim 1 characterized in that a pair of scales is disposed in side-by-side relationship on respective opposite sides of said slot formed in said planar surface of said body member.

3. A tool as defined in claim 2 wherein said index means comprises a pair of pointers disposed on opposite sides of said thumb slide means an overlying respectively said pair of scales.

4. A gauging tool for providing a direct measurement of the size of an object comprising:
    a body member having an opening at one of its longitudinal extremities for receiving said object,
    a pair of tongs disposed within said body member and pivotally joined at one extremity thereof, said tongs having tips at their opposite extremity for contacting said object, said tips being retracted within said body member when said tongs are in an open condition and extending into said opening in response to the closing of said tongs,
    said body member having a planar surface, an elongated longitudinal slot formed in said surface, at least one measurement scale disposed on said planar surface in proximity to said slot,
    thumb slide means operatively disposed in said slot and having an index means, said thumb slide means engaging said tongs, the movement of said thumb slide means along said slot in a direction toward said opening in said body member tending to close said tongs, whereby said tips are brought into contact with said object, the position of said index means relative to said scale at the time of said contact providing a direct reading of the size of said object.

5. A tool as defined in claim 4 characterized in that said tongs include hubs formed respectively on the inner surfaces thereof and a coil spring suspended between said hubs to stabilize the movement of said tongs in accordance with the position of said thumb slide means.

6. A tool as defined in claim 5 characterized in that a pair of scales is disposed in side-by-side relationship on respective opposite sides of said slot formed in said planar surface of said body member.

7. A tool as defined in claim 6 wherein said index means comprises a pair of pointers disposed on opposite sides of said thumb slide means and overlying respectively said pair of scales.

8. A tool as defined in claim 7 wherein said body member is comprised of a base and a top cover, said tongs being disposed in said base, said top cover including said planar surface and said longitudinal slot, and means for joining said base and said top cover to form an integral unit.

9. A tool as defined in claim 8 further including homologous arcuate grooves formed respectively in said base and said top cover for accommodating said coil springs suspended between said hubs of said tongs.

10. A tool as defined in claim 8 wherein an aperture is provided at the pivot point of said tongs, said means for joining said base an said top cover including at least a screw passing through said base and entering said top cover via said aperture in said tongs.

11. A tool as defined in claim 8 wherein said thumb slide means is comprised of a central partition disposed along the longitudinal axis of said body member in a plane transverse to that of said planar surface, said central partition having opposed extremities, a ridged arcuate thumb portion being at one of said extremities and a narrowed tab being at the other of said extremities, a section integral with said partition and intermediate said thumb portion and said tab, said section being substantially parallel to said planar surface and having legs at its opposite extremities which rest upon the inner surface of said base and are parallel to said partition, said section forming a pair of apertures separated by said partition for accommodating said tongs, said thumb portion of said thumb slide means protruding from said slot in said planar surface, and said base and said top cover having grooves on the respective inner surfaces thereof for accommodating said tab and said section in sliding movement in response to the actuation of said thumb slide means.

12. A tool as defined in claim 11 wherein the inner surfaces of said legs of said section in contact with the outer surfaces of said tongs are curved.

13. A tool as defined in claim 12 wherein the envelope of said body member conforms substantially to the arcuate configuration of said tongs when the latter are in an open position.

14. A tool as defined in claim 13 wherein said body member is tapered at its extremity adjacent said opening.

15. A tool as defined in claim 14 wherein said opening in said body member is generally semicircular.

16. A tool as defined in claim 15 further characterized in that said body member includes an insert bearing said scales, said insert being recessed in said top cover and forming therewith said planar surface.

17. A tool as defined in claim 16 characterized in that said object to be measured is a nut or bolt head and said pair of scales are respectively SAE and metric.

18. A tool as defined in claim 17 wherein said body member includes a lubrication chamber at its other extremity, said lubrication chamber containing a lubricant, and means for applying said lubricant.

19. A tool as defined in claim 18 further including a spring clip affixed to a recess in the outer surface of said base of said body member.

* * * * *